(12) United States Patent
Forsberg et al.

(10) Patent No.: US 10,833,556 B2
(45) Date of Patent: *Nov. 10, 2020

(54) ROTOR SECTION WITH CENTER TUBE FOR SUBMERSIBLE PUMP ASSEMBLY MOTOR

(71) Applicant: Baker Hughes Incorporated

(72) Inventors: Michael Forsberg, Claremore, OK (US); James C. Clingman, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 675 days.

This patent is subject to a terminal disclaimer.

(21) Appl. No.: 15/386,137

(22) Filed: Dec. 21, 2016

(65) Prior Publication Data

US 2017/0264161 A1    Sep. 14, 2017

Related U.S. Application Data

(60) Provisional application No. 62/307,633, filed on Mar. 14, 2016.

(51) Int. Cl.
*H02K 7/00* (2006.01)
*H02K 1/30* (2006.01)
(Continued)

(52) U.S. Cl.
CPC ............. *H02K 7/003* (2013.01); *E21B 4/003* (2013.01); *E21B 43/128* (2013.01); *F04D 13/10* (2013.01);
(Continued)

(58) Field of Classification Search
None
See application file for complete search history.

(56) References Cited

U.S. PATENT DOCUMENTS 6,566,774 B2   5/2003   Parmeter et al.
6,956,310 B1   10/2005  Knox
(Continued)

FOREIGN PATENT DOCUMENTS

| CN | 201570925 U | 9/2010 |
|---|---|---|
| JP | H01-270761 A | 10/1989 |
| JP | 2015086817 A | 5/2015 |

OTHER PUBLICATIONS

International Search Report and Written Opinion dated May 2, 2017 for corresponding International application No. PCT/US2017/013414.

(Continued)

*Primary Examiner* — Nguyen Tran
(74) *Attorney, Agent, or Firm* — Bracewell LLP; James E. Bradley

(57) ABSTRACT

A submersible well pump assembly has a pump driven by an electrical motor. The motor has a number of rotor sections axially separated from each other by radial bearings. Each of the rotor sections has disks stacked together, each of the disks having a central opening and slots circumferentially spaced around the central opening. Metal rods extend through the slots. A center tube extends through the central openings of the disks. The center tube has an outer diameter in an interference fit with the disks. A slot and key arrangement between the inner diameter of the center tube and the motor shaft rotates the motor shaft in unison. The ends of the center tube extend past end rings of the rotor sections and abut with center tubes of adjacent rotor sections.

18 Claims, 4 Drawing Sheets

(51) Int. Cl.
- *E21B 4/00* (2006.01)
- *F04D 13/10* (2006.01)
- *F04D 29/047* (2006.01)
- *H02K 16/02* (2006.01)
- *E21B 43/12* (2006.01)
- *F04D 25/06* (2006.01)
- *H02K 1/28* (2006.01)
- *H02K 5/132* (2006.01)
- *H02K 7/08* (2006.01)

(52) U.S. Cl.
CPC ..... *F04D 25/0686* (2013.01); *F04D 29/0473* (2013.01); *H02K 1/28* (2013.01); *H02K 1/30* (2013.01); *H02K 5/132* (2013.01); *H02K 7/08* (2013.01); *H02K 16/02* (2013.01); *F05D 2260/37* (2013.01)

(56) References Cited

U.S. PATENT DOCUMENTS

| | | |
|---|---|---|
| 9,127,683 B2 | 9/2015 | Knapp |
| 9,334,865 B2 | 5/2016 | Johnson et al. |
| 2006/0175064 A1 | 8/2006 | Yuratich |
| 2007/0252470 A1 | 11/2007 | Lee |
| 2009/0039722 A1 | 2/2009 | Cain et al. |
| 2010/0301698 A1 | 12/2010 | Goto et al. |
| 2014/0079575 A1 | 3/2014 | Forsberg |
| 2014/0127052 A1 | 5/2014 | Knapp |
| 2016/0168964 A1* | 6/2016 | Li ............ F04D 13/10 417/420 |
| 2016/0315527 A1* | 10/2016 | Clingman ......... H02K 1/276 |

OTHER PUBLICATIONS

Machine English Translation of JP H01-270761.

* cited by examiner

ROTOR SECTION WITH CENTER TUBE FOR SUBMERSIBLE PUMP ASSEMBLY MOTOR

CROSS REFERENCE TO RELATED APPLICATION

This application claims priority to provisional application Ser. No. 62/307,633, filed Mar. 14, 2016.

FIELD OF THE DISCLOSURE

This disclosure relates in general to electrical submersible well pumps and in particular to a motor with rotor sections with disks mounted on a center tube through which the motor shaft extends.

BACKGROUND

Electrical submersible pump assemblies ("ESP") are commonly used to pump well fluid from hydrocarbon producing wells. A typical ESP has a rotary pump driven by an electrical motor. The motor is filled with a dielectric motor oil. A pressure equalizer couples to the motor to reduce a pressure differential between the motor oil and the hydrostatic pressure of the well fluid.

The motor has a stator with windings that are normally configured in a three-phase arrangement. The stator has a central bore in which a rotor is located. The rotor is made up of a number of rotor sections mounted on a shaft for rotation in unison. Radial bearings separate the rotor sections from each other and frictionally engage the bore of the stator to prevent rotation of the radial bearing and radially stabilize the shaft.

Each rotor section has a large number of thin disks or laminations. Each disk has a central opening and a number of slots spaced circumferentially around the central opening. Copper rods extend through the slots and attach to end rings at opposite end of the rotor section. The central openings of the disks slide over the shaft. A slot and groove arrangement secures the disks to the shaft for rotation in unison.

While these motors work well, slight radial movement can occur between the rotor disks and the shaft. The slight radial movement can create rotor imbalance, causing vibration. Aligning the rotor sections 35 during assembly can be difficult.

SUMMARY

A submersible well pump assembly has a pump and a motor. The motor has a rotatable motor shaft with rotor sections axially spaced apart from each other by radial bearings. A pressure equalizer is coupled to the motor to reduce a pressure differential between lubricant in the motor and a hydrostatic pressure of well fluid on the exterior of the motor. Each of the rotor sections has a large number of disks stacked together. Each of the disks has a central opening and slots circumferentially spaced around the central opening. Metal rods extend through the slots. A center tube extends through the central openings of the disks for rotation therewith. The center tube has an inner diameter that receives the motor shaft. A slot and key arrangement between the inner diameter of the center tube and the motor shaft causes the motor shaft to rotate in unison.

The center tube and the disks may be axially fixed to each other as well as rotationally. In one example, an interference fit exists between the central opening of each of the disks and an outer diameter of the center tube.

In one embodiment, the center tube protrudes past opposite ends of the rotor section into abutment with the center tubes of adjacent ones of the rotor sections. Each of the radial bearings has a hub into which the center tubes of adjacent ones of the rotor sections extend. Each of the center tubes is rotatable relative to hub.

In another embodiment, a bearing sleeve is located between and in abutment with opposing ends of the center tubes of adjacent ones of the rotor sections. The bearing sleeve is coupled to the shaft for rotation therewith. Each of the radial bearings has a hub surrounding one of the bearing sleeves in rotating sliding engagement. The bearing sleeve has an axial length less than axial lengths of the center tubes of adjacent ones of the rotor sections.

An end ring is located at each end of each rotor section. In one embodiment, the center tube has ends protruding past each of the end rings. A length of the center tube is less than an axial distance from an upper side of one of the end rings to a lower side of the other of the end rings. In another embodiment, the center tube is shorter and has ends recessed within the end rings.

In the embodiment wherein the center tube extends past the end rings, the ends of the center tube are in abutment with ends of the center tubes of adjacent ones of the rotor sections. In this embodiment, the center tube has an outer diameter smaller than the inner diameters of the end rings, defining annular gaps between the center tube and each of the end rings. Each of the radial bearings has a hub with one end that extends into the annular gap of one of the rotor sections and an opposite end that extends into the annular gap of an adjacent one of the rotor sections.

Figure 1:
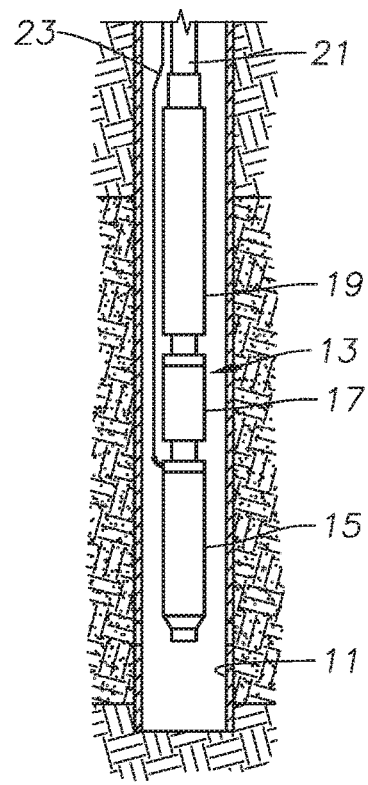
FIG. 1 is a side view of an electrical submersible well pump assembly having a motor with a rotor constructed in accordance with this disclosure.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, a well has a string of casing 11 cemented within. An electrical submersible pump (ESP) 13 pumps well fluid flowing into casing 11. ESP 13 includes a motor 15, which is typically a three-phase electrical motor. An end of motor 15 connects to a seal section 17 that seals dielectric lubricant in motor 15. Also, seal section 17 may have a pressure equalizing element to equalize the pressure of the lubricant in motor 15 with the hydrostatic pressure of the well fluid on the exterior of motor 15.

A pump 19 connects to seal section 17. Pump 19 has an intake for receiving well fluid from casing 11 and a discharge connected to a string of production tubing 21. Pump 19 is normally a rotary type, such as a centrifugal pump having a large number of stages, each stage having a rotating impeller and a nonrotating diffuser. Alternately, pump 19 could be another type, such as a progressing cavity pump.

A power cable 23 with a motor lead on a lower end extends alongside tubing 21 to motor 15 for supplying power. Although ESP 13 is shown vertically in the drawings, it could be located in inclined or horizontal sections of casing 11.

Figure 2:
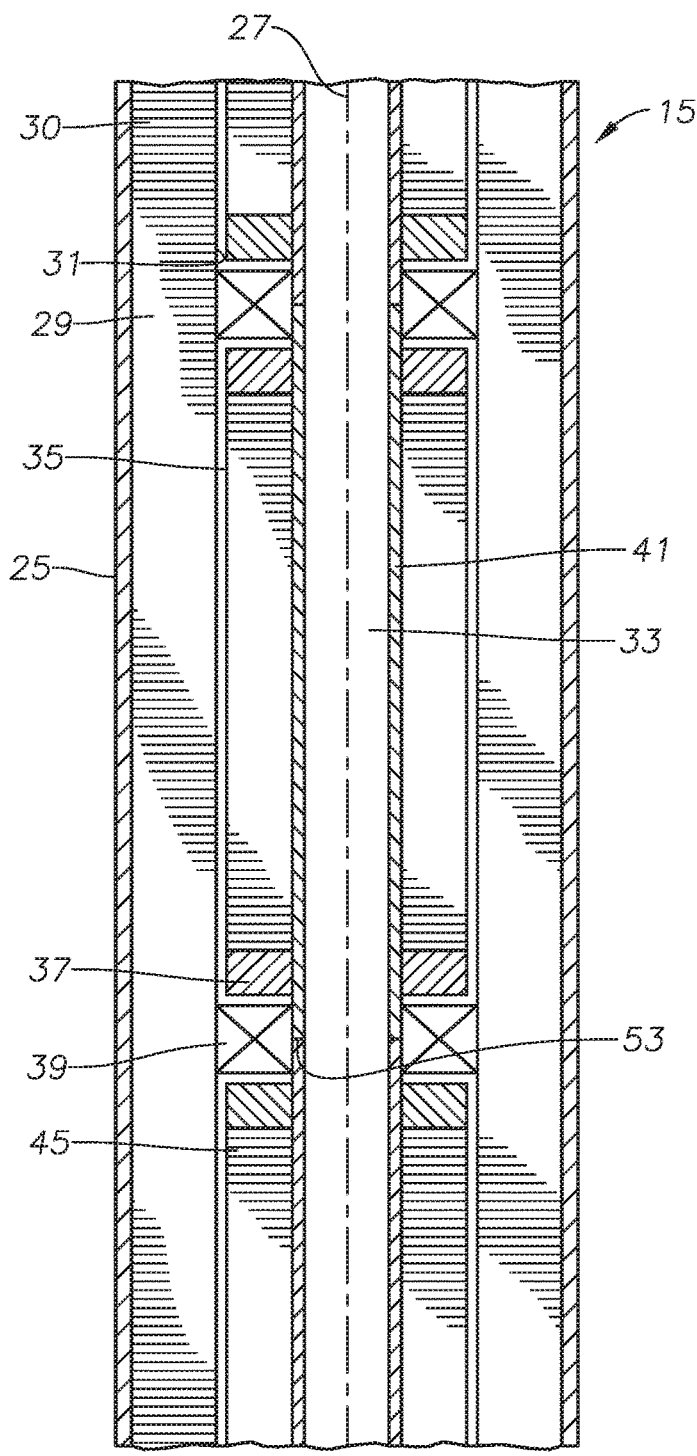
FIG. 2 is a sectional view of part of the motor of FIG. 1, illustrating rotor sections of the rotor mounted on center tubes.

Referring to FIG. 2, motor 15 has a tubular housing 25 with a longitudinal axis 27. A stator 29 fits nonrotatably in housing 25. Stator 29 is made up of a large number of steel stator disks or laminations 30 stacked on top of each other. Motor windings (not shown) extend through slots in stator disks 30, the windings being connected to power cable 23 (FIG. 1). Stator 29 has a stator bore or passage 31 through which a drive shaft 33 extends.

Shaft 33 supports a rotor made up of a number of rotor sections 35 that cause shaft 33 to rotate when electrical power is supplied to stator 29. Each rotor section 35 has end rings 37, normally copper, on opposite ends. Rotor sections 35 may be about 1 to 2 feet in length and are axially spaced apart from each other a shorter distance. Radial bearings 39 fit between adjacent rotor sections 35. Each radial bearing 39 is in gripping engagement with stator bore 31 to prevent rotation of radial bearing 39.

Each rotor section 35 has a center tube 41 that is mounted to shaft 33 for rotating shaft 33 in unison. Center tube 41 is a rigid member that may be formed of steel. The wall thickness of each center tube 41 may vary, such as from about 3/16 to 1/4 inch.

Figure 3:
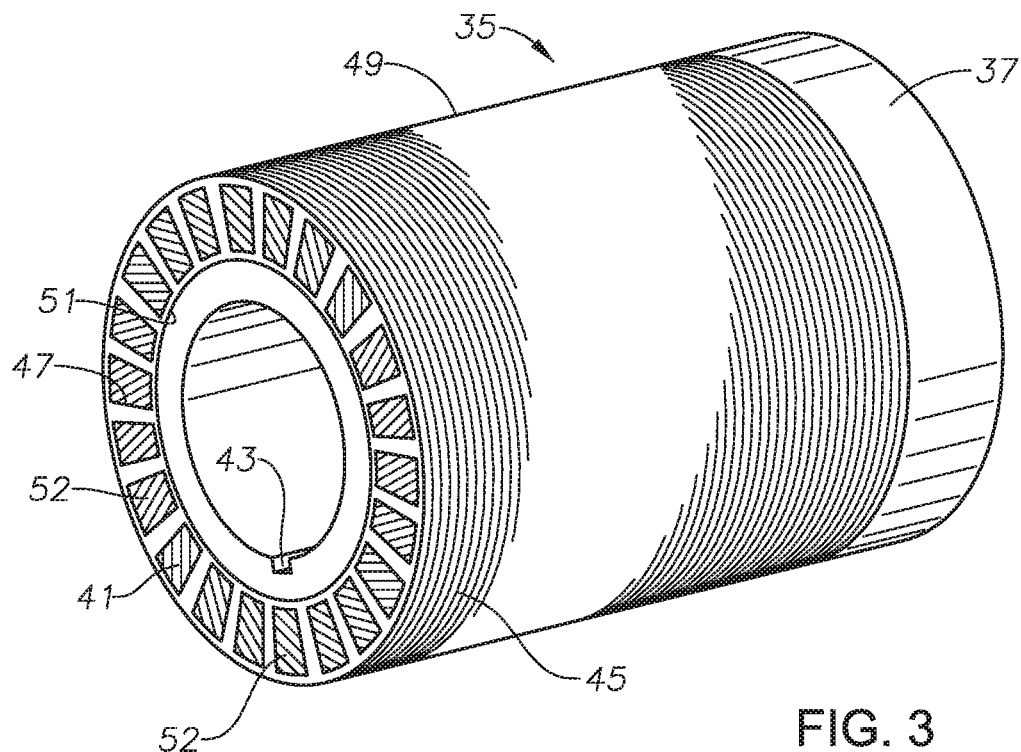
FIG. 3 is perspective view, partly sectioned, of a portion of one of the rotor sections of FIG. 2, shown removed from the motor shaft and housing.

FIG. 3 illustrates a portion of one of the rotor sections 35, the others having the same configuration. In this embodiment, a groove 43 extends axially along an inner diameter of center tube 41. A key 44 (FIG. 4) fits within groove 43 and a mating groove in shaft 33 to cause center tube 41 to rotate shaft 33 in unison. During assembly, rotor sections 35 slide over shaft 33 in engagement with key 44. Each rotor section 35 is made up of a stack of thin, steel laminations or disks 45.

Figure 4:
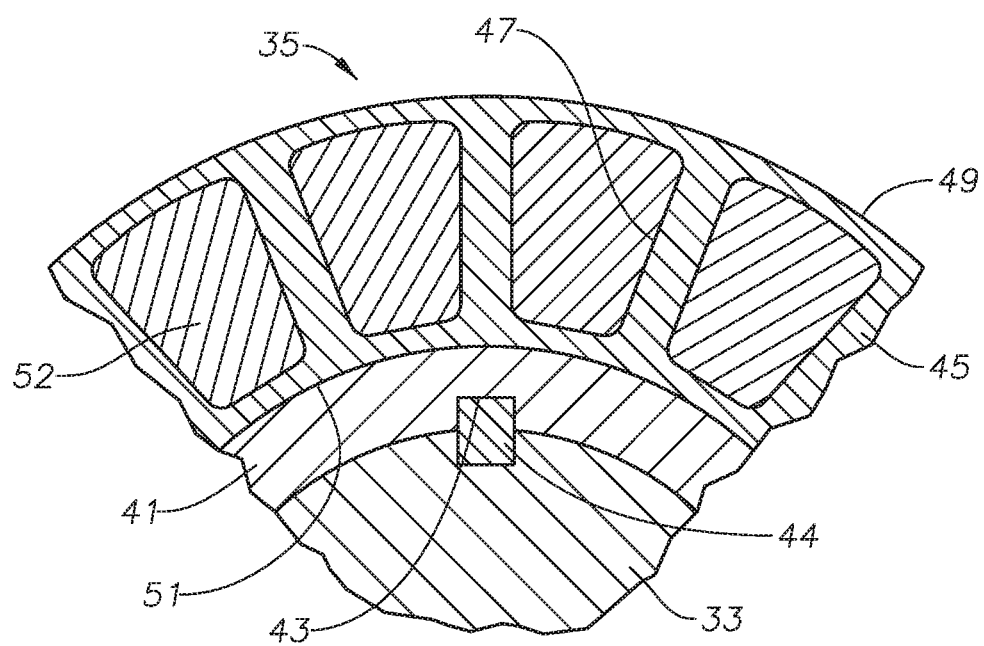
FIG. 4 is an enlarged sectional view of a portion of the rotor section shown in FIG. 3.

As shown also in FIG. 4, each disk 45 has slots 47 spaced circumferentially apart from each other. Slots 47 are located between an outer diameter 49 of disk 45 and a central opening 51. Slots 47 may be closed such that they do not intersect either outer diameter 49 or central opening 51. Slots 47 of each disk 45 align with each other, and copper rods 52 extend through the aligned slots 47. The shape of slots 47 and rods 52 is shown as trapezoidal but may vary. The ends of rods 52 extend into and are secured to each end ring 37 (FIG. 2), such as by a welding or brazing process.

Each disk central opening 51 is attached to center tube 41 to retain center tube 41 to rotate in unison with disks 45. The attachment between center tube 41 and disks 45 may be rigid, preventing rotational and axial relative movement between disks 45 and center tube 41. For example, in FIGS. 3 and 4, each disk inner diameter 51 is initially slightly smaller than the outer diameter of center tube 41, creating an interference fit. Alternately, disks 45 could be secured to center tube 41 with epoxy or solder. In another alternate, a key and slot arrangement may be used to lock disks 45 to center tube 41 for rotation in unison. For example, each disk 45 would have a tab or key (not shown) protruding radially inward from inner diameter 51 that engages an axially extending groove on the exterior of center tube 41.

Figure 5:
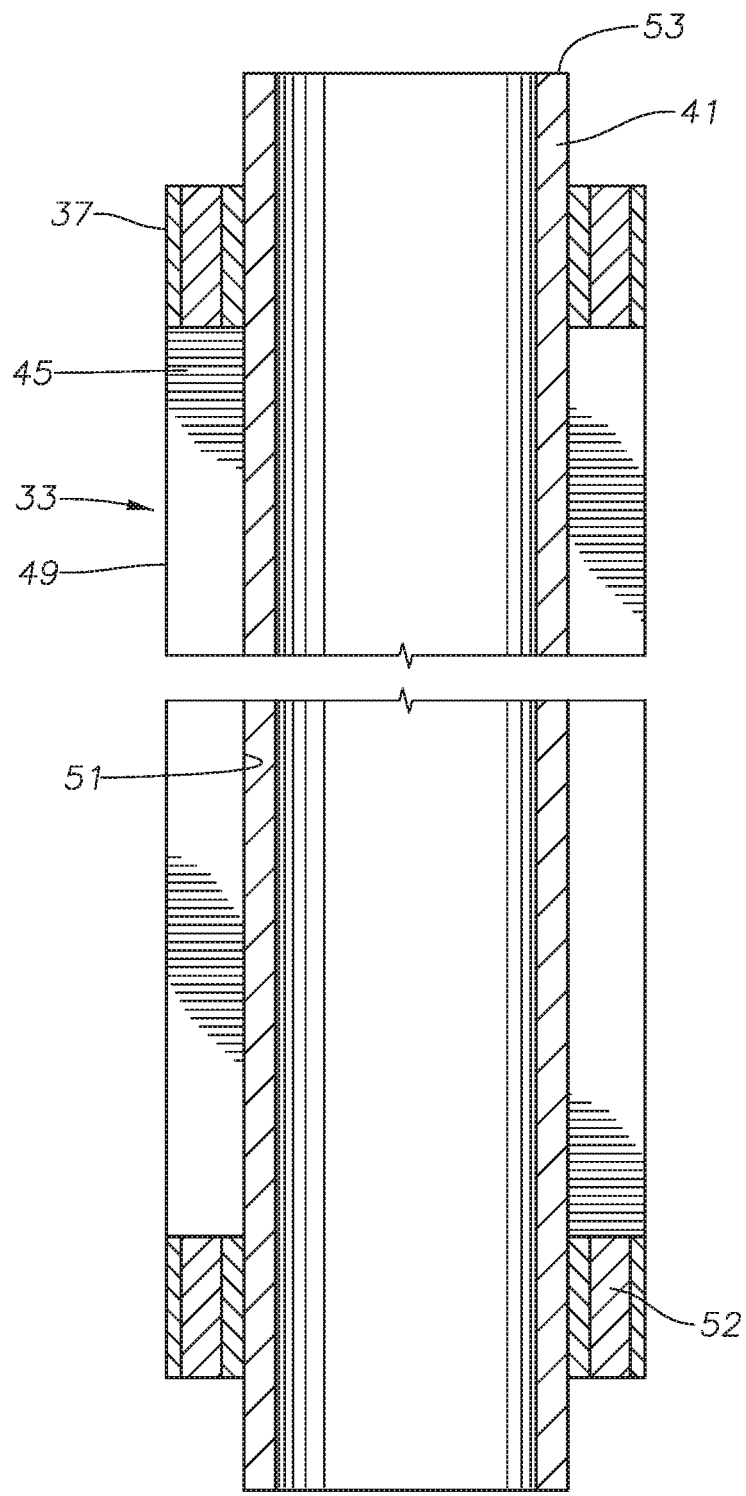
FIG. 5 is an axial sectional view of a portion of the rotor section of FIG. 3.
Figure 6:
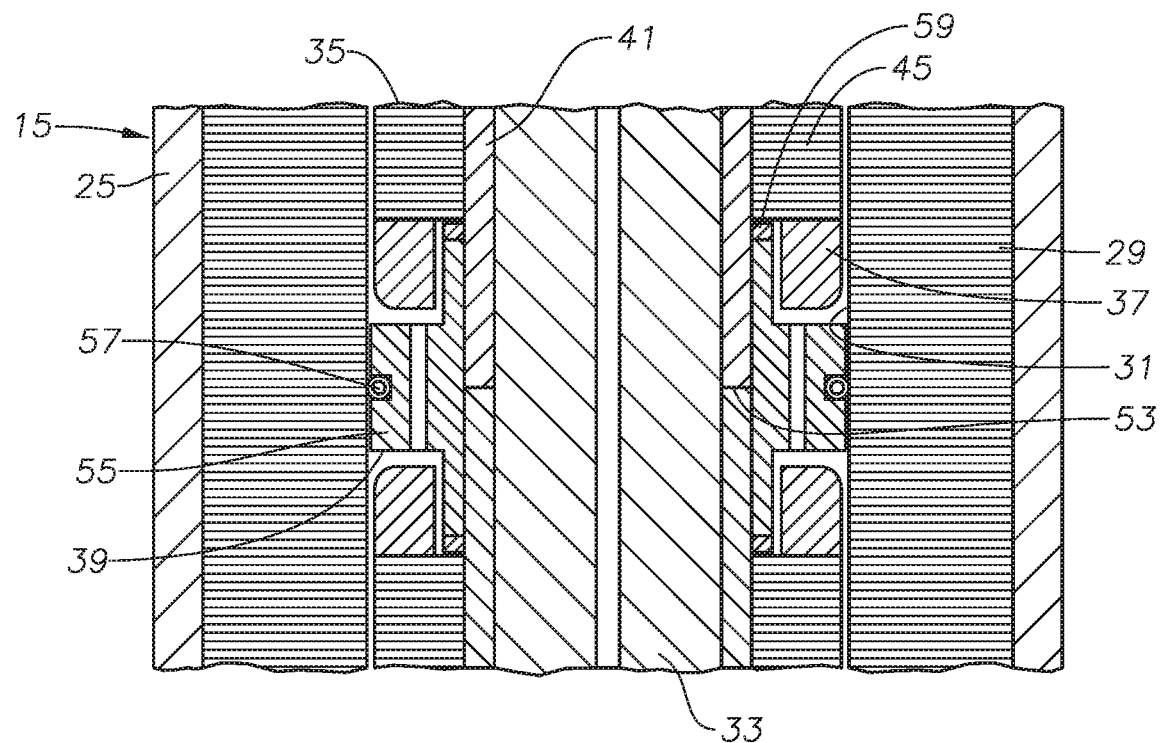
FIG. 6 is an enlarged axial sectional view of part of the rotor shown in FIG. 2, with more details of a radial bearing, and showing the rotor section center tubes extending past the ends of the rotor sections into an inner diameter of the radial bearing.

Referring to FIGS. 5 and 6, in one embodiment, center tube 41 is longer than the axial dimension of rotor section 35 from the upper side of the upper end ring 37 to the lower side of the lower end ring 37. The ends 53 of each center tube 41 protrude past both end rings 37. As shown in FIGS. 2 and 6, the center tube end 53 of one rotor section 35 abuts the center tube end 53 of an adjacent rotor section 35 in this embodiment. Thus, shaft 33 will be completely enclosed by center tubes 41 throughout the entire length of the rotor made up of rotor sections 35. In this embodiment, the inner diameter of end rings 37 is larger than the outer diameter of center tubes 41, creating annular gaps between them.

FIG. 6 also illustrates an example of radial bearing 39. Many types of radial bearings 39 may be employed. In FIG. 6, radial bearing 39 has a hub 55 that slides over center tubes 41. The upper and lower ends of hub 55 extend the gaps between the inner diameter of end rings 37 and the outer diameter of center tubes 41. Center tube ends 53 may abut approximately midway along the length of hub 55.

At least one anti-rotation ring 57 is located on the outer diameter of hub 55 for frictionally engaging stator bore 31 to prevent rotation of hub 55. Anti-rotation rings 57 may be of various types, such as a ring formed of an elastomer that swells when immersed in the lubricant of motor 15.

Thrust washers 59 may be positioned between the upper and lower ends of hub 55 and adjacent rotor sections 35. The thrust washer 59 on the upper end of hub 55 engages the lowermost disk 45 of the rotor section 35 next above. The thrust washer 59 on the lower end of hub 55 engages the uppermost rotor disk 45 of the rotor section 35 next below.

The axial dimension of hub 55 plus thrust washers 59 determines the axial distance that adjacent rotor sections 35 are apart from each other.

Figure 7:
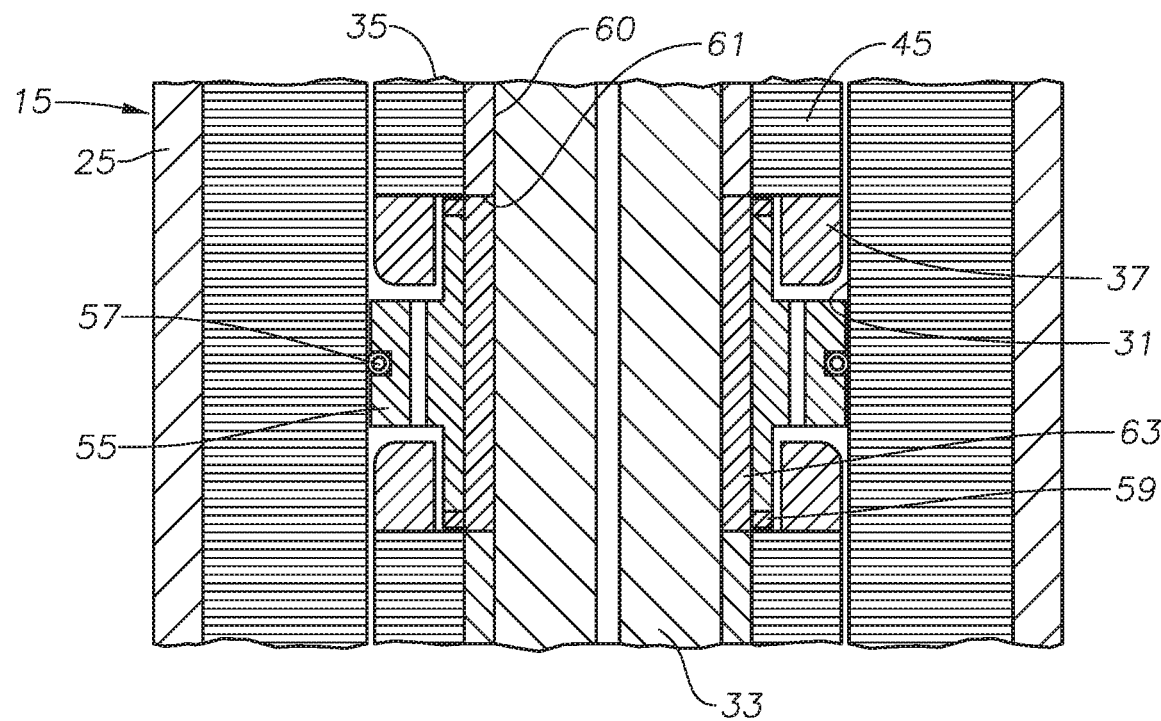
FIG. 7 is a view similar to FIG. 6, but showing an alternate embodiment with the rotor section center tubes terminating at the ends of the rotor sections and engaging a sleeve of the radial bearing.

FIG. 7 illustrates an alternate embodiment, and components that are the same as the first embodiment have the same reference numerals. Each center tube 60 is shorter than the overall length of its rotor section 35, rather than longer as in the first embodiment. Each end 61 of center tube 60 terminates approximately at one end of the stack of rotor disks 45. Each end 61 is thus recessed within the inner diameter of one of the end rings 37.

A bearing sleeve 63 is located between and in abutment with adjacent center tube ends 61. Bearing sleeve 63 has a length equal to hub 55 plus thrust washers 59. The length of bearing sleeve 63 is much less than the length of center tubes 60. Bearing sleeve 63 has a key and slot arrangement with shat 33 to rotate in unison with shaft 33. The inner diameter of bearing sleeve 63 is in sliding rotational engagement with radial bearing hub 55. The wall thickness of bearing sleeve 63 may be the same as the wall thickness of each center tube 60.

Center tubes 53 or 60 provide more rigidity to rotor sections 35. The additional stiffness allows a smaller annular gap between the outer diameters 49 of rotor sections 35 and the inner wall of stator bore 31 than rotor sections lacking center tubes. Center tubes 53 or 60 control slight radial movement of rotor disks 45 and stabilize rotor imbalance. Center tubes 53 or 60 assist in aligning adjacent rotor sections 35 during assembly.

In addition to the variations mentioned, adjacent center tubes 41 could be formed with a male/female feature on the ends 53 to facilitate alignment of adjacent rotor sections 35. Further, end portions of center tubes 41 could be threaded to allow end rings 37 to be screwed onto rotor sections 35.

The present invention described herein, therefore, is well adapted to carry out the objects and attain the ends and advantages mentioned, as well as others inherent therein. While only a few embodiments of the invention have been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

The invention claimed is:

1. A submersible well pump assembly, comprising:
a pump;
a motor having a stator containing motor windings, the stator having a central bore with a longitudinal axis, the motor having a rotatable motor shaft in the central bore, and a plurality of rotor sections axially spaced apart from each other by radial bearings;
a pressure equalizer coupled to the motor to reduce a pressure differential between lubricant in the motor and a hydrostatic pressure of well fluid on the exterior of the motor; each of the rotor sections comprising:
a plurality of disks stacked together, each of the disks having a central opening and slots circumferentially spaced around the central opening;
a center tube extending through the central openings of the disks and secured for rotation therewith, the center tube having an inner diameter that receives the motor shaft; and
a slot and key arrangement between the inner diameter of the center tube and the motor shaft for rotating the motor shaft in unison.

2. The assembly according to claim 1, wherein the center tube and the disks are axially fixed to each other.

3. The assembly according to claim 1, wherein an interference fit exists between the central opening of each of the disks and an outer diameter of the center tube.

4. The assembly according to claim 1, wherein:
the plurality of rotor sections comprises an upper rotor section, a lower rotor section, and an intermediate rotor section located between the upper rotor section and the lower rotor section;
the center tube comprises an upper center tube in the upper rotor section, an intermediate center tube in the intermediate rotor section, and a lower center tube in the lower rotor section;
the upper center tube has a lower end below the upper rotor section;
the lower center tube has an upper end above the lower rotor section;
the intermediate center tube has an upper end in abutment with the lower end of the upper center tube and a lower end in abutment with the upper end of the lower center tube;
the radial bearings comprise an upper radial bearing between the upper rotor section and the intermediate rotor section and a lower bearing between the intermediate rotor section and the lower rotor section;
the upper radial bearing has a hub that receives the lower end of the upper center tube and the upper end of the intermediate center tubeeach of the upper and intermediate center tubes being rotatable relative to hub of the upper radial bearing; and
the lower radial bearing has a hub that receives the lower end of the intermediate center tube and the upper end of the lower center tube, each of the intermediate and lower center tubes being rotatable relative to the hub of the lower radial bearing.

5. The assembly according to claim 1, wherein:
the plurality of rotor sections comprises an upper rotor section and a lower rotor section;
the center tube comprises an upper center tube in the upper rotor section and a lower center tube in the lower rotor section, the assembly further comprises:
a bearing sleeve located between and in abutment with a lower end of the upper center tube and an upper end of the lower center tube, the bearing sleeve being coupled to the shaft for rotation therewith; and wherein
the radial bearing between the upper rotor section and the lower rotor section has a hub surrounding the bearing sleeve in rotating sliding engagement.

6. The assembly according to claim 5, wherein the bearing sleeve has an axial length less than axial lengths of the upper and lower center tubes.

7. The assembly according to claim 1, wherein each of the rotor sections further comprises:
an end ring at each end of the rotor section; and wherein the center tube has ends protruding past each of the end rings.

8. The assembly according to claim 1, wherein each of the rotor sections further comprises:
an end ring at each end of the rotor section, the disks being sandwiched between the end rings; and wherein
the center tube has ends recessed within the end rings.

9. The assembly according to claim 1, wherein each of the rotor sections further comprises:
an end ring located at each end of the rotor section, each of the end rings having an inner diameter; wherein the center tube extends past the end rings and has ends in abutment with ends of the center tubes of adjacent ones of the rotor sections;

the center tube has an outer diameter smaller than the inner diameters of the end rings, defining annular gaps between the center tube and each of the end rings; and each of the radial bearings has a hub with one end that extends into the annular gap of one of the rotor sections and an opposite end that extends into the annular gap of an adjacent one of the rotor sections.

10. The assembly according to claim 1, wherein each of the rotor sections further comprises:

an end ring joined to each end of each of the rotor sections; and wherein a length of the center tube is less than an axial distance from an upper side of one of the end rings to a lower side of the other of the end rings.

11. A submersible well pump assembly, comprising:

a pump;

a motor having a stator containing motor windings and having a central bore with a longitudinal axis, the motor having a rotatable motor shaft, an upper rotor section separated from an intermediate rotor section by an upper radial bearing, and a lower rotor section separated from the intermediate rotor section by a lower radial bearing;

a pressure equalizer coupled to the motor to reduce a pressure differential between lubricant in the motor and a hydrostatic pressure of well fluid on the exterior of the motor;

each of the upper, intermediate and lower rotor sections comprising:

a plurality of disks stacked together, each of the disks having a central opening and slots circumferentially spaced around the central opening;

a plurality of rods extending through the slots parallel with the axis;

a center tube extending through the central openings of the disks, the center tube having an outer diameter in an interference fit with the central openings of the disks, causing the center tube to rotate in unison with the disks, the center tube having an inner diameter that receives the motor shaft; and a slot and key arrangement between the inner diameter of the center tube and the motor shaft for rotating the motor shaft in unison.

12. The assembly according to claim 11, wherein:

the center tube of the intermediate rotor section protrudes past opposite ends of the intermediate rotor section into abutment with the center tubes of the upper and lower rotor sections; the upper radial bearing has a hub into which the center tubes of the upper and intermediate rotor sections extend, each of the center tubes of the upper and intermediate rotor sections being rotatable relative to hub; and the lower radial bearing has a hub into which the center tubes of the intermediate and lower rotor sections extend, each of the center tubes of the intermediate and lower rotor sections being rotatable relative to the hub of the lower radial bearing.

13. The assembly according to claim 11, wherein:

a length of the center tube in the upper rotor section is no greater than a length of the upper rotor section;

a length of the center tube in the intermediate rotor section is no greater than a length of the intermediate rotor section;

a length of the center tube in the lower rotor section is no greater than a length of the lower rotor section; and wherein the motor further comprises:

an upper bearing sleeve located between and in abutment with the center tube of the upper rotor section and the of the center tube of the intermediate rotor section, the upper bearing sleeve being coupled to the shaft for rotation therewith;

a lower bearing sleeve located between and in abutment with the center tube of the intermediate rotor section and the center tube of the lower rotor section, the lower bearing sleeve being coupled to the shaft for rotation therewith; and wherein each of the upper and lower radial bearings has a hub that receives one of the bearing sleeves in rotating sliding engagement.

14. The assembly according to claim 11, wherein each of the rotor sections further comprises:

an end ring located at each end of the upper, intermediate and lower rotor sections, the end rings being joined to opposite ends of the rods, each of the end rings having an inner diameter; wherein the center tube of the intermediate rotor section extends past the end rings of the intermediate rotor section and has ends in abutment with ends of the center tubes of the upper and lower rotor sections;

the center tube of each of the rotor sections has a smaller outer diameter than the inner diameters of the end rings of each of the rotor sections, defining an annular gap between the center tube and each of the end rings of the each of the rotor sections; the upper radial bearing has a hub with an upper end that extends into the annular gap of the upper rotor section and a lower end that extends into the annular gap of the intermediate rotor section; and the lower radial bearing has a hub with an upper end that extends into the annular gap of the intermediate rotor section and a lower end that extends into the annular gap of the lower rotor section.

15. A submersible well pump assembly, comprising:

a pump;

a motor having a longitudinal axis, a rotatable motor shaft, and upper and lower rotor sections axially separated from each other by a radial bearing;

each of the upper and lower rotor sections comprising:

a plurality of disks stacked together, each of the disks having a central opening and slots circumferentially spaced around the central opening;

a plurality of metal rods extending through the slots parallel with the axis;

upper and lower end rings secured to upper and lower ends, respectively, of the metal rods;

a center tube extending through the central openings of the disks and being rigidly attached to the disks, the center tube having an inner diameter that receives the motor shaft;

a slot and key arrangement between the inner diameter of the center tube and the motor shaft for rotating the motor shaft in unison; wherein the center tube of the upper rotor section has a lower end located below lower end ring of the upper rotor section;

the center tube of the lower rotor section has an upper end located above the upper end ring of the lower rotor section and into abutment with the lower end of the center tube of the upper rotor section; and the radial bearing has a hub that receives in rotating sliding contact the lower end of the upper rotor section and the upper end of the lower rotor section.

16. The assembly according to claim 15, wherein:

the lower end ring of the upper rotor section has an inner diameter larger than an outer diameter of the center tube of the upper rotor section, defining an upper gap therebetween;

the upper end ring of the lower rotor section has an inner diameter larger than an outer diameter of the center tube of the lower rotor section, defining a lower gap therebetween; and the hub has an upper end that is located in the upper gap and a lower end that fits in the lower gap.

17. The assembly according to claim 15, wherein:

the center tube of each of the upper and lower rotor sections has an outer diameter that is in an interference engagement with the central openings of the disks.

18. The assembly according to claim 15, wherein:

a length of the center tube of each of the upper and lower rotor sections is greater than an axial distance from an upper side of the upper end ring to a lower side of the lower end ring.

\* \* \* \* \*

UNITED STATES PATENT AND TRADEMARK OFFICE
CERTIFICATE OF CORRECTION

Page 1 of 1

PATENT NO. : 10,833,556 B2
APPLICATION NO. : 15/386137
DATED : November 10, 2020
INVENTOR(S) : Michael Forsberg and James Clingman It is certified that error appears in the above-identified patent and that said Letters Patent is hereby corrected as shown below:

In the Specification

Column 1, Line 45, reads:
"tion. Aligning the rotor sections 35 during assembly can be"
It should read:
--tion. Aligning the rotor sections during assembly can be--;

Column 5, Line 17, reads:
"shat 33 to rotate in unison with shaft 33. The inner diameter"
It should read:
--shaft 33 to rotate in unison with shaft 33. The inner diameter--;

In the Claims

Column 6, Line 29, Claim 4 reads:
"intermediate center tubeeach of the upper and interme-"
It should read:
--intermediate center tube each of the upper and interme- --; and Column 6, Line 30, Claim 4 reads:
"diate center tubes being rotatable relative to hub of the"
It should read:
--diate center tubes being rotatable relative to the hub of the--.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*